US012093540B2

(12) United States Patent
Gim et al.

(10) Patent No.: US 12,093,540 B2
(45) Date of Patent: Sep. 17, 2024

(54) SYSTEMS, METHODS, AND APPARATUS FOR SELECTING DEVICES IN TIERED MEMORY

(71) Applicant: Samsung Electronics Co., Ltd., Suwon-si (KR)

(72) Inventors: Jongmin Gim, Milpitas, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/840,587

(22) Filed: Jun. 14, 2022

(65) Prior Publication Data

US 2023/0342045 A1 Oct. 26, 2023

Related U.S. Application Data

(60) Provisional application No. 63/333,543, filed on Apr. 21, 2022.

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC ..... G06F 3/0631; G06F 3/0604; G06F 3/0679
See application file for complete search history.

(56) References Cited

U.S. PATENT DOCUMENTS

| 9,600,407 B2 | 3/2017 | Faber |
| 10,042,750 B2 | 8/2018 | Roberts et al. |
| 11,016,923 B1 * | 5/2021 | Bolen ..................... G06F 3/061 |

(Continued)

FOREIGN PATENT DOCUMENTS

WO 2018182473 A1 10/2018

OTHER PUBLICATIONS

Yadgar, Gala et al., "Karma: Know-it-All Replacement for a Multilevel cAche," USENIX Association, FAST '07: 5th USENIX Conference on File and Storage Technologies, 2007, pp. 169-184.
(Continued)

*Primary Examiner* — Masud K Khan
(74) *Attorney, Agent, or Firm* — Renaissance IP Law Group LLP

(57) ABSTRACT

A method may include receiving a request for a memory page in a memory tier comprising a first memory device and a second memory device, wherein the first memory device has a first parameter and the second memory device has a second parameter, selecting, based on the first parameter and the second parameter, the first memory device, and allocating, based on the request, based on the selecting, the memory page from the first memory device. The selecting may include determining a first result based on the first parameter, determining a second result based on the second parameter, and comparing the first result and the second result. The determining the first result may include combining the first parameter with a first weight. The first weight may include a first scale factor, and the combining the first parameter with the first weight may include multiplying the first parameter and the first scale factor.

20 Claims, 10 Drawing Sheets

(56) References Cited

U.S. PATENT DOCUMENTS

| | | | |
|---|---|---|---|
| 11,672,049 B2* | 6/2023 | Toeda | H04W 72/23 |
| | | | 370/329 |
| 2017/0177477 A1* | 6/2017 | Sutera | G06F 12/0607 |
| 2017/0371777 A1 | 12/2017 | Kim et al. | |
| 2019/0095122 A1* | 3/2019 | Guim Bernat | G06F 3/0604 |
| 2020/0125503 A1 | 4/2020 | Graniello et al. | |
| 2020/0192798 A1 | 6/2020 | Natu | |
| 2020/0328879 A1 | 10/2020 | Makaram et al. | |
| 2020/0371692 A1 | 11/2020 | Doorn et al. | |
| 2021/0011864 A1 | 1/2021 | Bernat et al. | |
| 2021/0019069 A1 | 1/2021 | Sen et al. | |
| 2021/0064531 A1 | 3/2021 | Bernat et al. | |
| 2021/0117334 A1 | 4/2021 | Bernat et al. | |
| 2021/0133583 A1 | 5/2021 | Chetlur et al. | |
| 2021/0232504 A1 | 7/2021 | Boyd et al. | |
| 2021/0311646 A1 | 10/2021 | Malladi et al. | |
| 2021/0311739 A1 | 10/2021 | Malladi et al. | |
| 2021/0349512 A1 | 11/2021 | Bernat et al. | |
| 2021/0349840 A1 | 11/2021 | Kumar et al. | |
| 2021/0373951 A1 | 12/2021 | Malladi et al. | |
| 2021/0374080 A1 | 12/2021 | Horwich et al. | |
| 2022/0114115 A1 | 4/2022 | Enamandram et al. | |
| 2023/0112720 A1* | 4/2023 | Shubeli | G06F 3/0631 |
| | | | 711/154 |

OTHER PUBLICATIONS

European Extended Search Report for Application No. 23168407.7, mailed Sep. 22, 2023.

* cited by examiner

SYSTEMS, METHODS, AND APPARATUS FOR SELECTING DEVICES IN TIERED MEMORY

REFERENCE TO RELATED APPLICATION

This application claims the priority benefit under 35 U.S.C. § 119(e) of U.S. Provisional Patent Application Ser. No. 63/333,543, filed on Apr. 21, 2022 which is incorporated by reference.

TECHNICAL FIELD

This disclosure relates generally to tiered memory, and more specifically to systems, methods, and apparatus for selecting devices in tiered memory.

BACKGROUND

Large sets of data provide challenges to store and process such data. Such datasets may be stored across a multitude of storage devices and provide added challenges to locate and access divided datasets. Tiered memory systems may provide faster memory access to address the challenges of large datasets, as well as provide faster memory access in general.

The above information disclosed in this Background section is only for enhancement of understanding of the background of the invention and therefore it may contain information that does not constitute prior art.

SUMMARY

A method may include receiving a request for a memory page in a memory tier comprising a first memory device and a second memory device, wherein the first memory device has a first parameter and the second memory device has a second parameter, selecting, based on the first parameter and the second parameter, the first memory device, and allocating, based on the request, based on the selecting, the memory page from the first memory device. The selecting may include determining a first result based on the first parameter, determining a second result based on the second parameter, and comparing the first result and the second result. The determining the first result may include combining the first parameter with a first weight. The first weight may include a first scale factor, and the combining the first parameter with the first weight may include multiplying the first parameter and the first scale factor. The determining the second result may include combining the second parameter with a second weight, the second weight may include a second scale factor, and the combining the second parameter with the second weight may include multiplying the second parameter by the second scale factor. The method may further include determining the first weight. Determining the first weight may include calculating, at least partially, the first weight. Determining the first weight may include receiving, at least partially, from a user, the first weight. Determining the first result may be further based on a third parameter of the first memory device. Determining the first result may include combining the first parameter with a first weight, and combining the third parameter with a second weight. The first weight may be a first scale factor, the second weight may be a second scale factor, and the determining the first result may include multiplying the first parameter and the first scale factor to generate a first term, multiplying the third parameter and the second scale factor to generate a second term, and adding the first term and the second term. The first parameter may include at least one of a latency, a bandwidth, or a utilization. The method may further include determining the first parameter. Determining the first parameter may include receiving, from the first memory device, the first parameter. Determining the first parameter may include measuring the first parameter. Determining the first parameter may include obtaining the first parameter from a memory data structure. The memory data structure may include a free page table. The first memory device may be a logical memory device based on a first physical memory device and a second physical memory device, and the first parameter may be based on interleaving the first physical memory device and the second physical memory device. The first parameter may be based on a switch connected to the first memory device. The first parameter may be based on an interleaving granularity of the first memory device.

A system may include one or more processors, wherein at least one of the one or more processors may be configured to receive a request for a memory page in a memory tier comprising a first memory device and a second memory device, wherein the first memory device has a first parameter and the second memory device has a second parameter, perform a selection, based on the first parameter and the second parameter, of the first memory device, and allocate, based on the request, based on the selection, the memory page from the first memory device. At least one of the one or more processors may be configured to determine the first parameter. The at least one of the one or more processors may be configured to receive the first parameter from the first memory device using a hot plug operation. The at least one of the one or more processors may be configured to perform the selection by determining a first result based on the first parameter, determining a second result based on the second parameter, and comparing the first result and the second result. The first result may be based on combining the first parameter with a first weight, and the at least one of the one or more processors may be configured to receive, at least partially, from a user space, the first weight. The system may further include at least one interface configured to connect the one or more processors to the memory tier. The interface may include a coherent interconnect interface. The system may further include a memory pool, wherein the memory pool may include the first memory device and the second memory device. The system may further include a switch connected between the one or more processors and the first memory device.

A method may include determining, based on a tiering request, a distance between a processor and a tiered memory device, and allocating, based on the distance, a memory page from the tiered memory device. Determining the distance may be based on a parameter of the tiered memory device. Determining the distance may include multiplying the parameter and a weight. Determining the distance may be further based on a second parameter of the tiered memory device. The parameter may be a first parameter, and determining the distance may include multiplying the first parameter by a first weight to generate a first term, multiplying the second parameter by a second weight to generate a second term, and adding the first term and the second term. The parameter may include at least one of a latency, a bandwidth, or a utilization.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
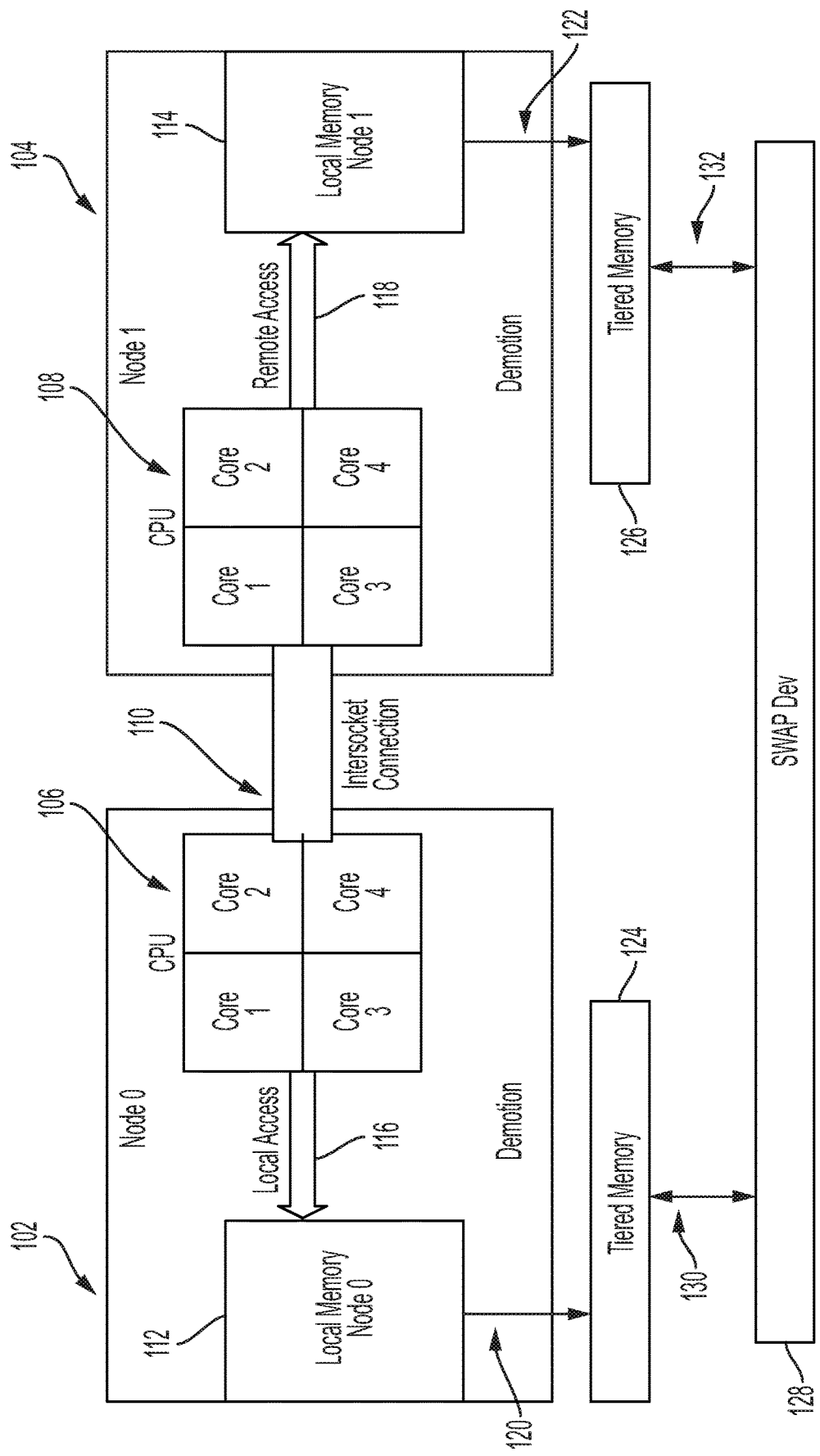
FIG. 1 illustrates an embodiment of a host system using migration from local memory in accordance with example embodiments of the disclosure.

Tiered memory systems may exploit the characteristics of different types of memory devices to enhance performance, cost, reliability, and/or the like. For example, a fast-tier may be implemented with memory devices that may be relatively fast, but may be relatively expensive and/or have a relatively small capacity. A slow-tier may be implemented with memory devices that are relatively slow, but may be less expensive and/or have a larger capacity. The fast-tier may be used to store frequently accessed data, whereas the slow-tier may be used to store less frequently accessed data. Data may be promoted and/or demoted between tiers to accommodate changing uses of the data.

In some aspects, a tiered memory system may not differentiate between different types of memory devices in the same tier. For example, a memory tier may be implemented with memory devices in a disaggregated memory pool. The disaggregated memory pool may include different types of memory devices that may have different performance parameters (e.g., latency, bandwidth, utilization, and/or the like) and/or may be connected to the memory system in different configurations using different interconnects, switches, interleaving granularity, cache line configurations, and/or the like. These different parameters, configurations, and/or the like may affect the performance of the different memory devices within the tier. However, the tiered memory system may disregard these differences when allocating memory pages from the tier.

A tiered memory scheme in accordance with example embodiments of the disclosure may select a specific memory device within a tier from which to allocate a memory page. For example, the tiered memory system may receive a request from an application to allocate a page of memory within a memory tier. The memory system may select a memory device within the tier based on one or more parameters of the memory device such as latency, bandwidth, utilization, and/or the like. The memory system may allocate the page of memory from the selected memory device to the application. In some embodiments, the memory system may select the device based on a comparison of one or more parameters of multiple devices within a memory tier.

In some embodiments, a memory system may select a memory device based on a distance between a processor and a memory device. In some embodiments, a distance may include a physical distance. Alternatively, or additionally, a distance may refer to an effective distance, or virtual distance between a processor and a memory device including, at least in part, any element or combination of elements that may influence the processor's ability to use the memory device. For example, a distance may be based on a latency of a memory device. If the memory device is connected to the processor through a switch, the distance may be increased to include one or more additional latencies caused by the switch. As another example, a distance may be based, at least in part, on a bandwidth of one or more memory devices. For example, a distance may be based, at least in part, on a bandwidth of a memory device. If the memory device is interleaved with one or more additional memory devices to form a logical memory device, the distance may be decreased based on the additional bandwidth provided by the interleaved memory devices. As a further example, a distance may be based, at least in part, on a combination of parameters (e.g., latencies, bandwidths, utilizations, and/or the like) of one or more memory devices, and the distance may be increased and/or decreased based on additional elements such as intervening switches, interleaving granularity, and/or the like.

In some embodiments, a distance for a memory device may be based, at least in part, on one or more parameters that may be combined with one or more weights. In some embodiments, a parameter may include a latency, a bandwidth, a utilization, and/or the like. In some embodiments, a weight may include one or more elements that may indicate a relative importance, influence, immediacy, and/or the like, of one or more parameters. For example, in some embodiments, a weight may include one or more factors, exponents, offsets, and/or the like, that may be applied to a parameter to indicate a relative scale factor of the parameter.

In some embodiments, a distance for a memory device may be determined, at least in part, using one or more calculations. For example, in some embodiments, a distance for a memory device may be determined by multiplying a first parameter and a first weight to generate a first term. The first term may be used as the distance, or the first term may be added to one or more additional terms generated by multiplying one or more additional parameters by one or more additional weights. In some embodiments in which one or more weights are implemented with one or more scale factors combined with one or more parameters, the use of one or more scale factors combined with one or more parameters may be referred to as weighted distance metrics (WDM).

In some embodiments, the use of one or more weights may provide a user, application, host, and/or the like, some amount of control over the selection of a device within a tier from which a page of memory may be allocated. For example, an application may provide one or more weights that may indicate the importance of one or more parameters to the application. In some embodiments, even though the memory system may perform the actual selection of the one or more devices within a tier from which memory is allocated to an application, the application may provide one or more guides to help the memory system select a memory device that may be beneficial for the application. For example, if maintaining data in contiguous memory is important to an application, the application may provide a relatively high scale factor for a utilization parameter and relatively low scale factors for one or more other parameters such as latency and/or bandwidth. As another example, if speed memory access speed is important to an application, the application may provide a relatively high scale factor for a latency parameter and relatively low scale factors for one or more other parameters such as bandwidth and/or utilization.

In some embodiments, a memory system may determine one or more parameters in any suitable manner. For example, one or more parameters may be sent to the memory system by a memory device as part of an initialization process (e.g., at power-up), as part of a hardware change process (e.g., hot plug insertion and/or removal), and/or the like. As another example, one or more parameters may be determined using one or more measurements. For instance, in some embodiments, a memory system may ping a memory device and measure the amount of time, including delays through any intervening switches, transmission lines, and/or the like, to receive a response to the ping. As another example, a memory system may determine a latency by calculating a delay through one or more switches, transmission lines, and/or the like. As a further example, memory system may determine a utilization of a memory device by consulting a data structure such as a free page table.

In some embodiments, a memory system may obtain one or more weights (e.g., from a user space) in any suitable manner. For example, in an embodiment in which a tiered memory system is implemented using an operating system kernel, an application may send one or more weights (e.g., scale factors) to the kernel using a system call, an application programming interface (API), and/or the like. As a further example, a user may send one or more weights (e.g., scale factors) to the kernel using a system configuration application.

In some embodiments, a tiered memory device selection scheme in accordance with the disclosure may be used with one or more promotion and/or demotion schemes. For example, a system with a non-uniform memory access (NUMA) architecture may implement a tiering scheme in which pages of data may be promoted and/or demoted by migrating the pages of data between different tiers. The NUMA scheme may determine which tier the data is to be moved to, and a device selection scheme in accordance with example embodiments of the disclosure may be used to select one or more devices within the tier to which the data is to be moved. In some embodiments, one or more weights (which may be provided by a user, application, and/or the like, to influence the selection of memory devices within a tier from which memory is allocated) may also be applied to the selection of one or more memory devices for promoting and/or demoting data. Thus, for example, if an application has provided a relatively high scale factor for a bandwidth parameter, and a page of data for the application is evicted from a fast-tier, the memory tiering system may move the application's page of data to a logical memory device in the slow-tier having one or more interleaved memory devices with relatively high bandwidth.

The principles disclosed herein have independent utility and may be embodied individually, and not every embodiment may utilize every principle. However, the principles may also be embodied in various combinations, some of which may amplify the benefits of the individual principles in a synergistic manner.

For purposes of illustrating the inventive principles of the disclosure, some example embodiments may be described in the context of specific implementation details such as a processing system that may implement a NUMA architecture, memory devices, and/or pools that may be connected to a processing system using an interconnect interface and/or protocol Compute Express Link (CXL), and/or the like. However, the principles are not limited to these example details and may be implemented using any other type of system architecture, interfaces, protocols, and/or the like.

In some embodiments, a CXL interconnect may provide access to multiple types and kinds of memory, and thus, the management and structure of the memory may be implemented in multiple ways. One such type of structure usable with CXL memory devices is a NUMA system architecture which may be used with a system using multiprocessing to use the location of a memory relative to a processor to modify the time to access memory. In some embodiments of NUMA architectures, memories considered close to the processor may be accessed faster than memory considered further from the processor. Thus, some NUMA architectures may use multiple types of memory and may include local memory for individual processing units to allow each processing unit to access memories in use without interference, and system memory for memories not being actively used. Individual processors may thus avoid interfering with the memory access of other processors when memories are in active use by a single processing unit. In some embodiments, and depending on the implementation details, using a NUMA architecture with CXL may provide expanded access to a larger variety of memory than local memory associated with a processor and system memory. In some embodiments, CXL may enable connections from each processing unit to a pool of different types of memory devices including various types of dynamic random-access memory (DRAM), double data rate (DDR) memory with multiple frequencies, persistent memory, storage class memory (SCM), CXL solid state drives (SSDs), any of which may or may not have switches (e.g., CXL switches), as well as any other type of memory which may be used alone or in combination with one or more other types of memory. These memory devices may differ in performance when accessed by a processing unit. In some embodiments, and depending on the implementation details, establishing a relative tiering of memory devices connected to a processing unit may allow a system to access non-local memory devices in a more efficient manner and increase system performance.

FIG. 1 illustrates an embodiment of a host system using migration from local memory in accordance with example embodiments of the disclosure. A host system 100 may include a first processing unit 102, Node 0, with a first CPU 106, and a second processing unit 104, Node 1, with a second CPU 108. The first processing unit 102 and the second processing unit 104 may be connected using an intersocket connection 110 to provide remote access 118 between the first processing unit 102 and the second processing unit 104. The first processing unit 102 may perform local access 116 to access a node 0 local memory 112. In some embodiments, the local memory 112 may include one or more types of memory, such as dynamic random access memory (DRAM), static random access memory (SRAM), and/or the like. The second processing unit 104 similarly may perform local access to a node 1 local memory 114. The first processing unit 102 may provide a signal over the intersocket connection 110 to the second processing unit 104 and access the node 1 local memory 114 via remote access 118 performed by the second CPU 108.

When a specific page of data is no longer used in the node 0 local memory 112, the page of data may be moved to a first tiered memory 124 in a first demotion operation 120. Data may be demoted from being retrieved from the node 0 local memory 112 via local access 116 to the first tiered memory 124. Depending on the implementation details, such a demotion may result in decreased performance when accessing the now demoted data, however, demotion of data may provide increased space in the node 0 local memory 112 for memory being currently accessed. Similarly, the node 1 local memory 114 may also have a second demotion 122 to transfer data from the node 1 local memory 114 to a second tiered memory 126. The first tiered memory 124 and the second tiered memory 126 may each include multiple memory devices and may each include multiple types of memory devices, including various CXL enabled memory devices. The first tiered memory 124 and the second tiered memory 126 may be connected to a swap service (SWAP dev) 128. The SWAP Dev 128 may allow data to be transferred to and/or from the first tiered memory 124 using a first transfer 130 and the second tiered memory 126 using a second transfer 132. The first transfer 130 may allow data stored in first tiered memory 124 to be transferred to and/or from a system memory such as a hard disk drive via the SWAP Dev 128. Similarly, the second transfer 132 allows data stored in second tiered memory 126 to be transferred to and from a system memory such as a hard disk drive via the SWAP Dev 128.

In the example embodiment illustrated in FIG. 1, data may be demoted from the local memory within the processing unit to tiered memory, and then transferred to and/or from the system memory. However, in the example embodiment illustrated in FIG. 1, data which may undergo the first demotion 120 to the first tiered memory 124 may be unable to transfer back to the node 0 local memory 112.

Figure 2:
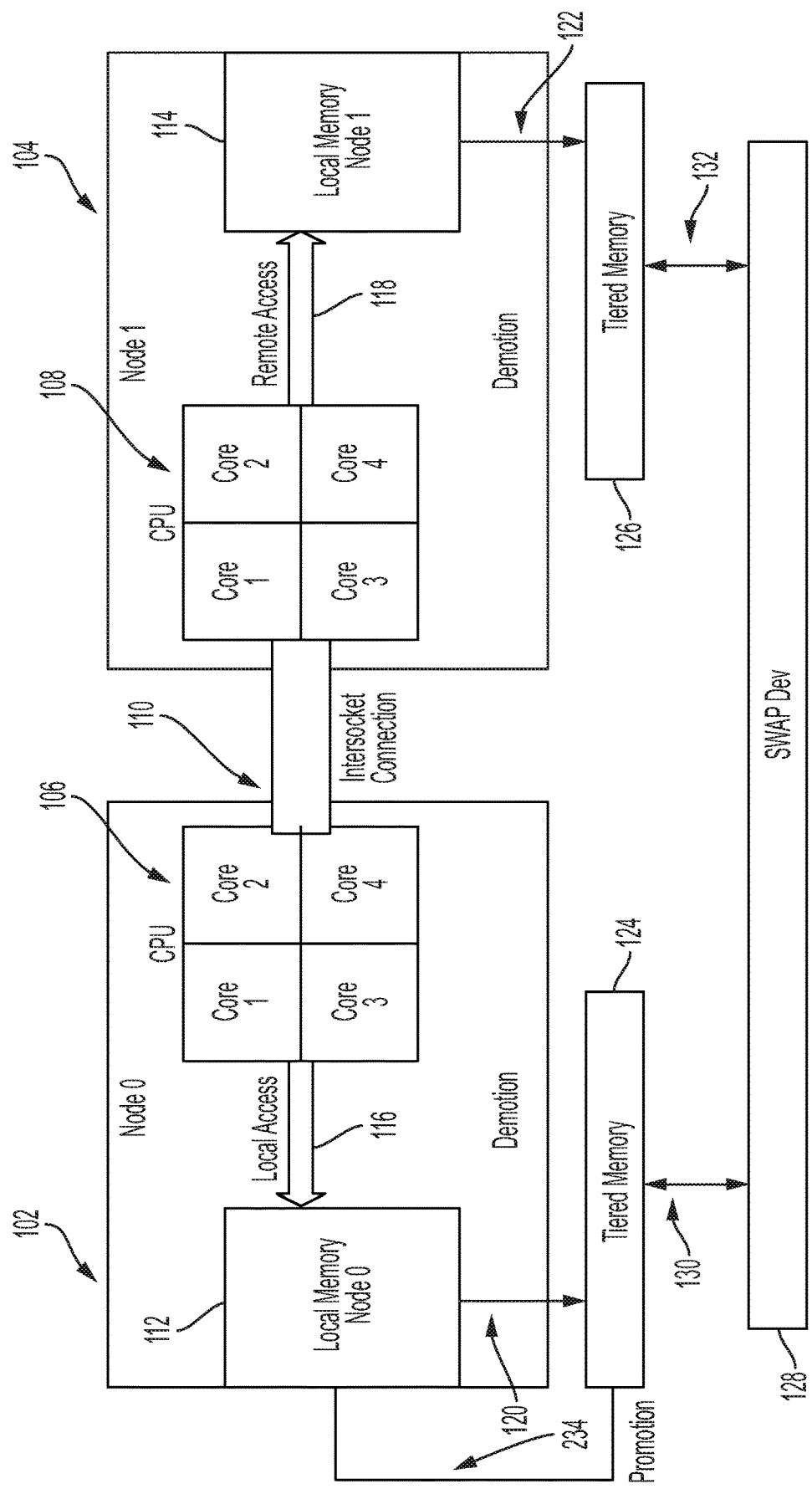
FIG. 2 illustrates an embodiment of a host system using migration to and from local memory in accordance with example embodiments of the disclosure.

FIG. 2 illustrates an embodiment of a host system using migration to and from local memory in accordance with example embodiments of the disclosure. The embodiment illustrated in FIG. 2 may include a host system 200 with a promotion 234 between the first tiered memory 124 and the node 0 local memory 112. Elements of FIG. 2 otherwise not specified may be consistent with their counterparts in the embodiment illustrated in FIG. 1. In the illustrative example of FIG. 2, data which received a first demotion 120 to the first tiered memory 124 may be able to transfer back to the node 0 local memory 112. In some embodiments, deciding which data should be promoted from tiered memory to local memory may be implemented as described below.

Figure 3:
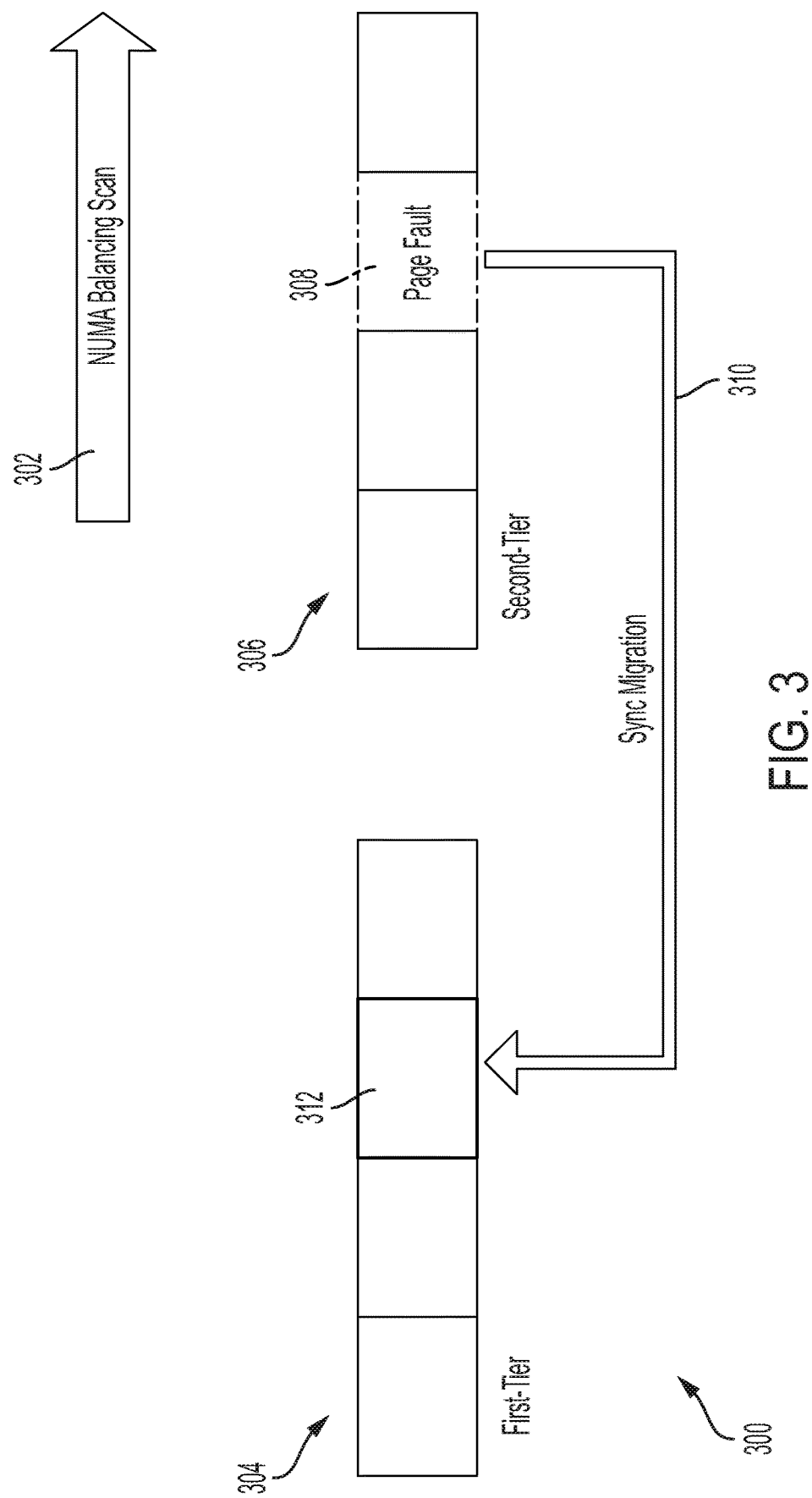
FIG. 3 illustrates a first embodiment of a synchronous promotion scheme in accordance with example embodiments of the disclosure.
Figure 4:
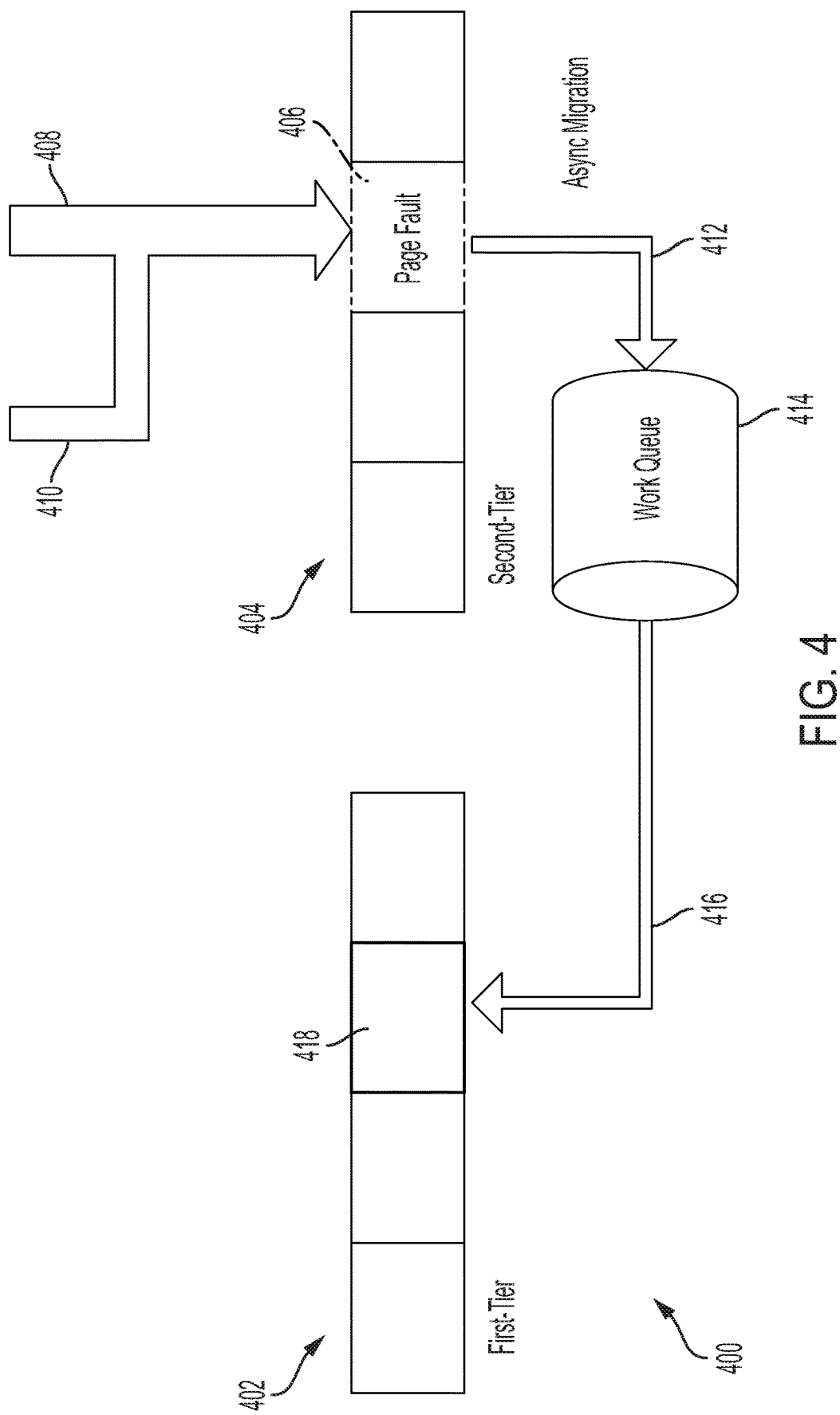
FIG. 4 illustrates a first embodiment of an asynchronous promotion scheme in accordance with example embodiments of the disclosure.
Figure 5:
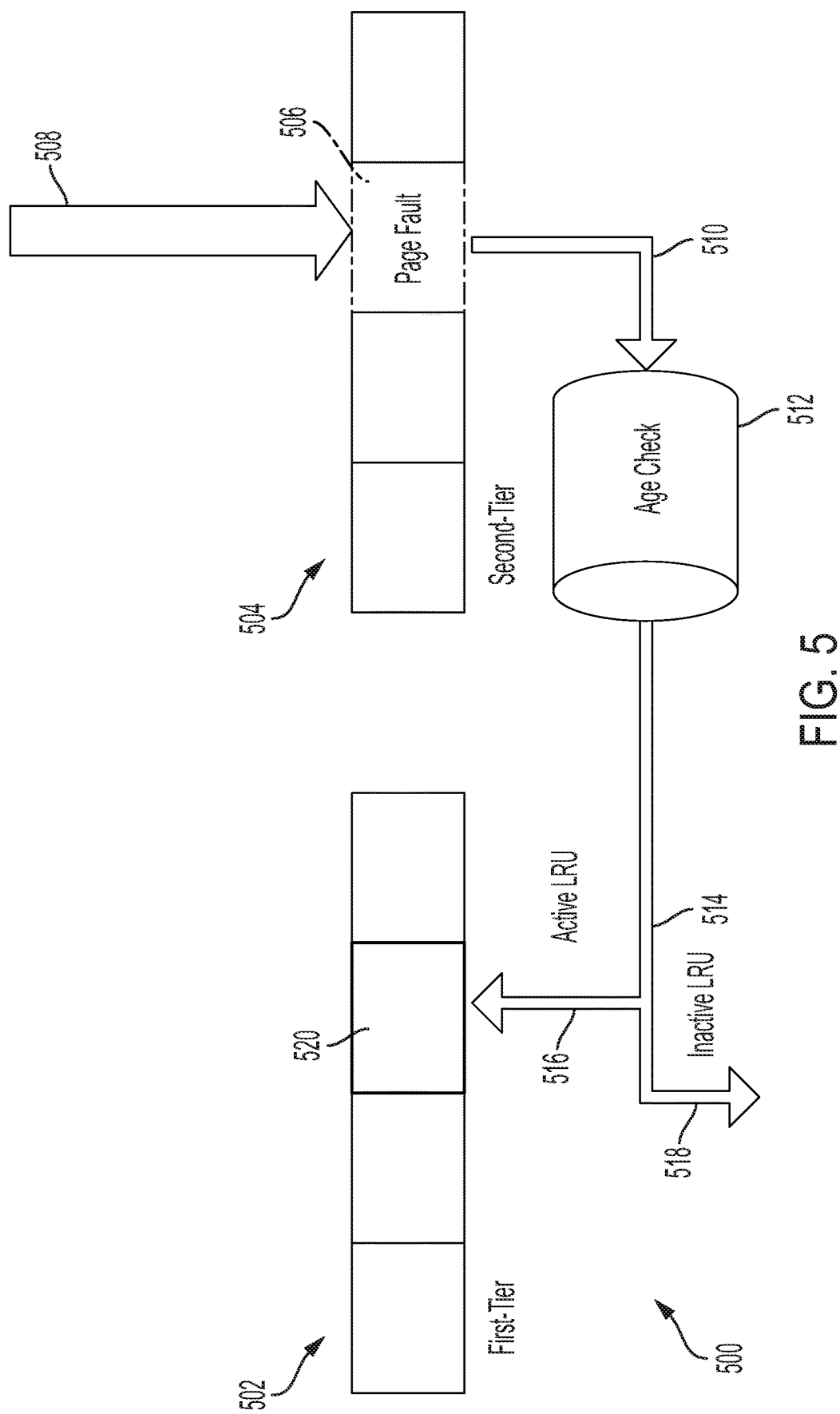
FIG. 5 illustrates a second embodiment of a synchronous promotion scheme in accordance with example embodiments of the disclosure.
Figure 6:
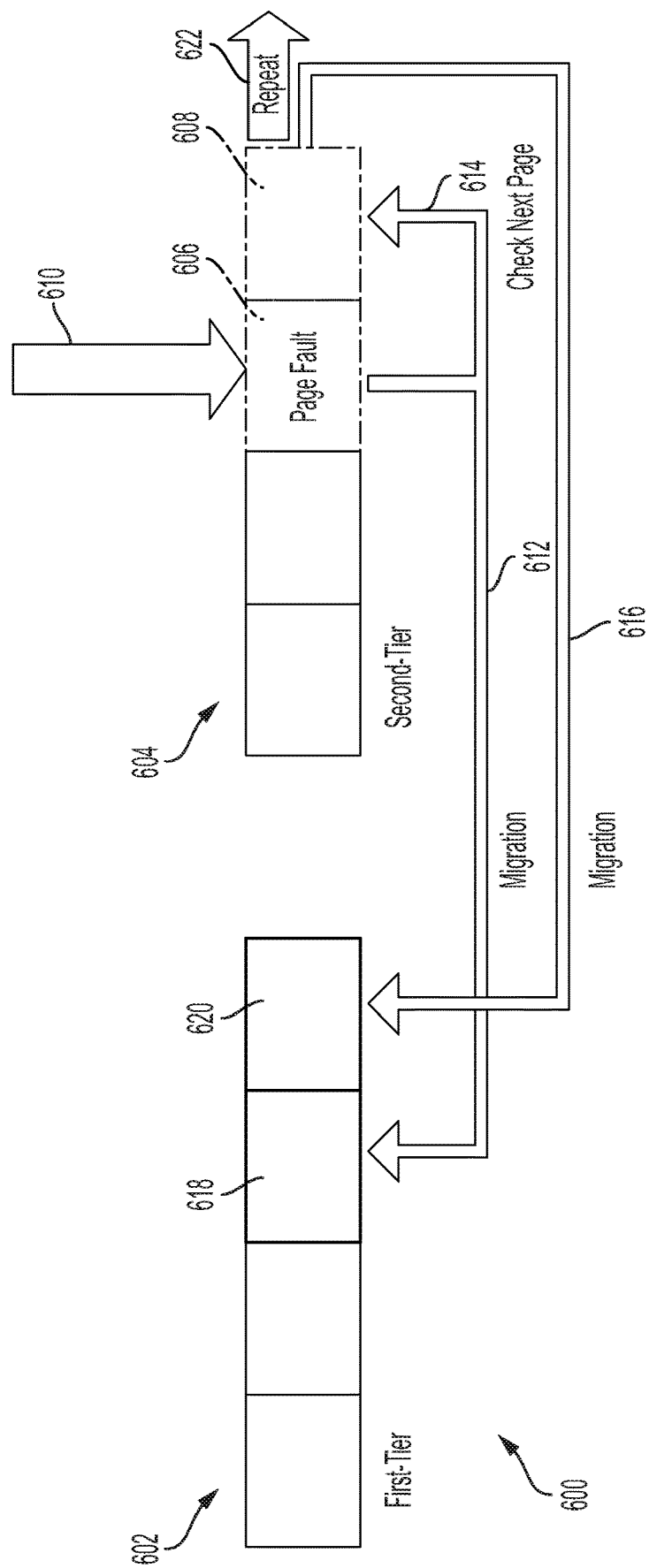
FIG. 6 illustrates a third embodiment of a synchronous promotion scheme in accordance with example embodiments of the disclosure.

In the example illustrative embodiments illustrated in FIG. 3, FIG. 4, FIG. 5, and/or FIG. 6, the first-tier memory may include the node 0 local memory 112, while the second-tier memory may include the first tiered memory 124. FIG. 3 through FIG. 6 thus may provide exemplary embodiments of the first demotion 120 and the promotion 234 as illustrated in FIG. 2. However, as discussed further herein, the individual CXL memory devices may themselves be split into one or more tiers of memory with the demotion and the promotion including promotion and demotion within the CXL devices and local memory.

FIG. 3 illustrates a first embodiment of a synchronous promotion scheme in accordance with example embodiments of the disclosure. The embodiment illustrated in FIG. 3 may include a synchronous migration promotion 300 implementing a movement between a first-tier of memory 304 and a second-tier of memory 306. A NUMA balancing scan 302 may be performed (e.g., automatically) to scan the memory devices connected to a host system. The NUMA balancing scan 302 may include a scanning a portion of the address space of the second-tier of memory 306 to identify individual memory pages associated with a task. The NUMA balancing scan 302 may mark the individual pages such as page 308 for a page fault. Upon detection of a page fault in page 308, a sync migration 310 may transfer content of page 308 on the second-tier of memory 306 to page 312 on the first-tier of memory 304. During a synchronous migration promotion 300, the process may be synchronized such that the page fault occurs with the migration.

FIG. 4 illustrates a first embodiment of an asynchronous promotion scheme in accordance with example embodiments of the disclosure. The embodiment illustrated in FIG. 4 may include an asynchronous migration promotion 400 implementing a movement between a first-tier of memory 402 and a second-tier of memory 404. A NUMA balancing scan may induce a page fault 408 in memory page 406. However, in the asynchronous migration promotion 400, the async migration 412 may be delayed according to a work queue 414, allowing access 410 to the memory page 406 until the work queue 414 executes the delayed migration 416 to page 418 on the first-tier of memory 402.

FIG. 5 illustrates a second embodiment of a synchronous promotion scheme in accordance with example embodiments of the disclosure. The embodiment illustrated in FIG. 5 may include a synchronous migration promotion 500 implementing a movement between a first-tier of memory 502 and a second-tier of memory 504. The NUMA balancing scan may mark a page fault 508 in page 506 of the second-tier of memory 504. The sync migration 510 may undergo an age check 512 which may evaluate the status of the individual page using techniques such as least recently used (LRU) to check the age of the memory page. Based on age check 512, a branch 514 of pages with an active LRU 516 may undergo a migration to a page 520 in the first-tier of memory 502 while pages with an inactive LRU 518 may not be migrated.

FIG. 6 illustrates a third embodiment of a synchronous promotion scheme in accordance with example embodiments of the disclosure. The embodiment illustrated in FIG. 6 may include a multi-step synchronous migration promotion 600 implementing a movement between a first-tier of memory 602 and a second-tier of memory 604. The NUMA balancing scan may mark a page fault 610 in a first memory page 606 of the second-tier of memory 604. A sync migration 612, similar to the sync migration 310, may transfer content of the first memory page 606 on the second-tier of memory 604 to a first page 618 on the first-tier of memory 602. Along with the sync migration 612, a check 614 may evaluate the next page, a second page 608 of the second-tier of memory 604 to determine if a second synch migration 616 may be used for the second page 608 to a second page 620 on the first-tier of memory 602. New pages next up in the second-tier of memory 604 may be checked while a repeat 622 that may check the next page until a maximum number of pages in the second-tier memory of 604 are reached.

As discussed above, a NUMA architecture may provide access to memory based on the relative location of memory to a processor. However, memory devices using interfaces such as CXL may include a wide variety of devices with various forms of performance, and the relative location with respect to a processor of a first memory device and a second memory device may use multiple differing parameters to define a relative distance. The distance between memory devices and a processor may include factors such as the latency, the bandwidth, and/or the memory utilization of the memory devices.

In some embodiments, the latency of a memory device may refer to the delay between a memory device and the processor in accessing memory. In some embodiments, latency may be viewed holistically, for example, to include a number of different delays, including network delay such as caused by the physical distance signals travel between a processor and a memory device as well as additional delays caused by equipment such as switches and/or routers. Additionally, or alternatively, the relative physical distance may be affected by the material of the path, and thus may suffer from different transmission speeds. For example, a portion of the signal path may use fiber optics, while another portion of the signal path may travel using copper wire. Signals traveling in copper wire and fiber optics may have different speeds which produce differing delays caused by the material based on the total length of the path on each material. Furthermore, latency may include delays caused by hardware such as the read-write speeds to access a memory device, and/or the structure of an arrayed memory device producing individual delays in reaching the individual elements of the array. For example, a first memory device in the form of DRAM may have a faster read/write speed than a second memory device in the form of a solid-state drive, but the total latency of the first memory device may be greater than the second memory device based on a greater physical distance for a signal to travel as well as intervening hardware such as switches producing a longer delay for a signal. Furthermore, the latency of a memory device may change over time based on conditions such as the relative network load, as well as performance of the memory device over time, and environmental factors such as changing temperature influencing delays on the signal path.

In some embodiments, the bandwidth of a memory device may refer to the maximum amount of data transferrable to a memory device over time. In some embodiments, bandwidth also may be viewed as including a differing number of variables which may affect the overall bandwidth of a memory device, such as the data capacity of the connections between the memory device and the processor, as well as internal features. For example, a memory device may have a first capacity for data transfer over the signal path between the processor and the memory device, while intervening hardware such as switches may have a different capacity for data transfer which may be greater or less than that of the physical signal path. Additionally, the path between the memory device and the processor may have multiple sections with different capacity, for example, a portion of the signal path may travel on a fiber optic cable, while another portion of the signal path may travel on copper wire. The portion traveling on copper wire may have a slightly higher effective speed for the signal to travel, but may have a lower capacity for signal over that same time when compared to fiber optic cable. Furthermore, the memory device may be an arrayed memory device with internal features such as switches and interconnections each with their own restrictions on capacity. While still further an arrayed memory device may be capable of accessing individual memory elements in parallel, increasing the capacity for data. This may be in addition to other properties of a memory device which may influence the number of threads which may be written at any one time, and thus the capacity of the memory device. The bandwidth of a memory device may also be subject to specific chokepoints where the capacity for data is reduced compared to other portions of the system, and in some conditions the reduced capacity at such a chokepoint may set the maximum capacity for the memory device. For example, a portion of the signal path may use copper wire with a reduced bandwidth compared to the rest of the signal path, and the portion of signal path using the copper wire may be significant enough to effectively reduce the overall bandwidth of the entire signal path to the bandwidth over the copper wire. Additionally, like latency, the bandwidth may be subject to change over time based on changes to the operation of the system, as well as environmental factors such as temperature affecting the capacity of signal paths.

In some embodiments, the memory utilization of a memory device may refer to the total memory usage of the memory device. One method of calculating the memory utilization of a memory device is to calculate the number of memory pages which are free in each zone of the memory device. Memory utilization thus may be a percentage of how much memory is in use for a given device. As memory utilization may reflect the number of free pages, a page migration to or from a device may cause the memory utilization to change over time. Additionally, or alternatively, memory utilization may be directly modified by a system freeing space on a memory device or by increasing utilization of the memory device.

As memory utilization may be measured in a unitless percent, bandwidth may be measured as a rate, and latency may be measured as a time delay, calculating a relative distance between a memory device and a processor may use scaling factors for each of the latency, the bandwidth, and the memory utilization of the memory devices. The relative distance for a memory device may be expressed by Eq. (1).

$$\text{D{\scriptsize ISTANCE}}=W_{(L)}*L+W_{(B)}*BW+W_{(U)}*UT \tag{1}$$

in which L may be latency, BW may be bandwidth, UT may be memory utilization, W(L) may be the scale factor for latency, W(B) may be the scale factor for bandwidth, and/or W(UT) may be the scale factor for memory utilization.

While Eq. (1) may provide a single scale factor for a single latency, a single scale factor for a single bandwidth, and/or a scale weight factor for a single memory utilization, the scale factors may be diverse based on the system configuration. For example, latency for an arrayed memory device (e.g., multiple physical devices that may implement, at least partially, a single logical device) may include separate measurements for each individual memory device of the arrayed device due to variances in their response time. The scale factor for latency thus may include scale factors for each of the individual memory devices of the arrayed memory device.

In some embodiments, the scale factors may be adjustable. In some embodiments, the weight factors may be preset. In other embodiments, the scale factors may be automatically determined based on one or more rules. Such an automatic determination may happen in real-time during the operation of a host system. In some embodiments, the one or more rules may provide a performance window for one or more of the latency, the bandwidth, and/or the memory utilization of the memory devices. In some embodiments, the scale factors of the one or more of the latency, the bandwidth, and/or the memory utilization of the memory devices may be adjusted automatically to maintain the performance of one or more of the latency, the bandwidth, and/or the memory utilization of the memory devices within a performance window. In some embodiments, the one or more rules may also place an emphasis on one or more of the latency, the bandwidth, and/or the memory utilization of the memory devices. For example, in some embodiments, latency may be prioritized such that the scale factors may be adjusted to produce a maximum performance with respect to latency. In still other embodiments, the scale factors may be adjusted by the user from a preset and may be adjustable during operations according to user instructions.

Figure 7:
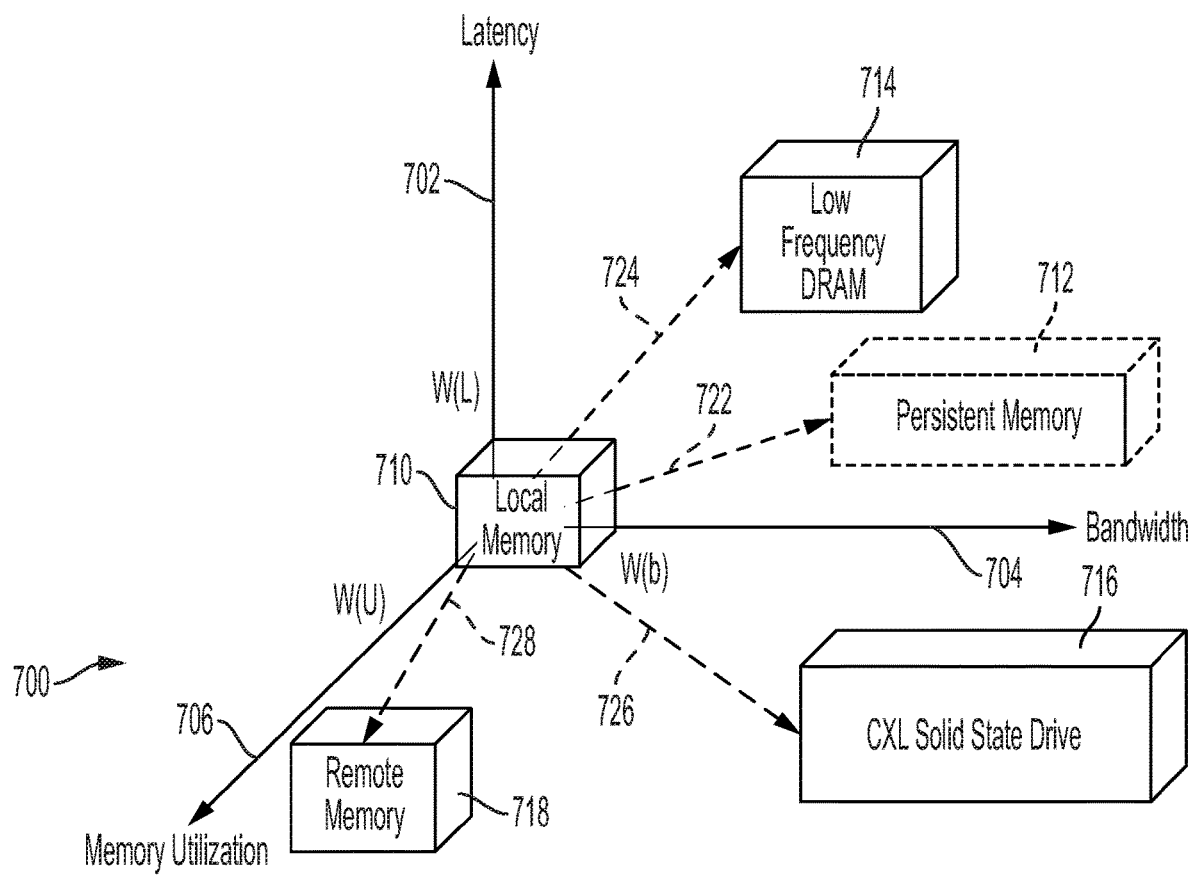
FIG. 7 illustrates an embodiment of a method for determining a relative distance between a memory and a processor in accordance with example embodiments of the disclosure.

FIG. 7 illustrates an embodiment of a method for determining a relative distance between a memory and a processor in accordance with example embodiments of the disclosure. In the embodiment illustrated in FIG. 7, a three-dimensional space 700 may have a latency axis 702, a bandwidth axis 704, and/or a memory utilization axis 706. A processing unit such as the first processing unit 102 of node 0, may have a processor such as the first CPU 106 at the origin of the latency axis 702, the bandwidth axis 704, and/or the memory utilization axis 706. A local memory 710, such as node 0 local memory 112, may be, when compared to other memory devices connected to a host system, at effectively no distance from the processor and thus be considered also at or near the origin. However, other memory devices connected to the processor may vary in the distance along one or more of the latency axis 702, the bandwidth axis 704, and the memory utilization axis 706. Each axis may incorporate one or more respective scale factors, such that a distance (e.g., a vector) measured from the origin of the three-dimensional space 700 represents the relative distance from a memory device to a processor. A first persistent memory 712 may be at a first distance 722 from the processor. A low frequency DRAM memory 714 may be at a second distance 724 from the processor. The first persistent memory 712 may be shown having a greater distance along the bandwidth axis 704 and the memory utilization axis 706 from the origin in comparison to the low frequency DRAM memory 714, however the first persistent memory 712 may be shown as having a lower distance along the latency axis 702 from the origin in comparison to the low frequency DRAM memory 714. As shown in FIG. 7, the first distance 722 is greater than the second distance 724. In contrast, a third distance 726 for a solid state drive (e.g., a CXL solid state drive) 716 may have a relatively short distance along the latency axis 702 compared to both the first persistent memory 712 and/or the low frequency DRAM memory 714. However, the distance along the bandwidth axis 704 and the memory utilization axis 706 for the CXL solid state drive 716 may be greater than the distances of both the first persistent memory 712 and the low frequency DRAM memory 714. As such, the third distance 726 may be less than both the first distance 722 and second distance 724. A remote memory 718 may be at a fourth distance 728 from the origin, and may have a relatively short distance along both the latency axis 702 and the bandwidth axis 704 in comparison to the first persistent memory 712, the low frequency DRAM memory 714, and/or the CXL solid state drive 716, However, the distance along the memory utilization axis 706 for the remote memory 718 may be larger than the distance along the memory utilization axis 706 for the first persistent memory 712, the low frequency DRAM memory 714, and/or the CXL solid state drive 716. As such, the fourth distance 728 may be less than the third distance 726 but greater than the first distance 722 and the second distance 724.

Upon determining a relative distance for connected memory devices, the distances may be used to establish one or more tiers of memory, to select one or more devices within a tier from which to allocate memory, and/or the like. For example, a threshold distance may be chosen to define a first tier of memory and a second tier of memory. The first tier of memory may include distances shorter than the threshold distance, and the second tier of memory may include one or more distances equal to or greater than the threshold distance. The threshold distance may be a predetermined threshold, may use a moving threshold which varies over time, and/or may be use adjustable. In further embodiments, multiple threshold distances may be established, each threshold distance establishing a new tier of memory. Alternatively, other means such as ranking individual memory devices using their relative distances and setting tiers based on the rank may be used. For example, in a host with three CXL memory devices, the device with the lowest relative distances may be set as a first tier, the device with the next lowest relative distances may be set as a second tier, while the device with the largest relative distances may be set as a third tier. Furthermore, based on changes to the relative distances, such as changes to the memory utilization of a memory device, the tiers may be recalculated. In addition, the tiers may also be recalculated based on the changes to the system, for example, if a new memory device is attached to the host system or an existing memory device is disconnected. Still further, a ranking may be used to choose which devices within a tier of memory may be used to assign individual pages of memory.

Figure 8:
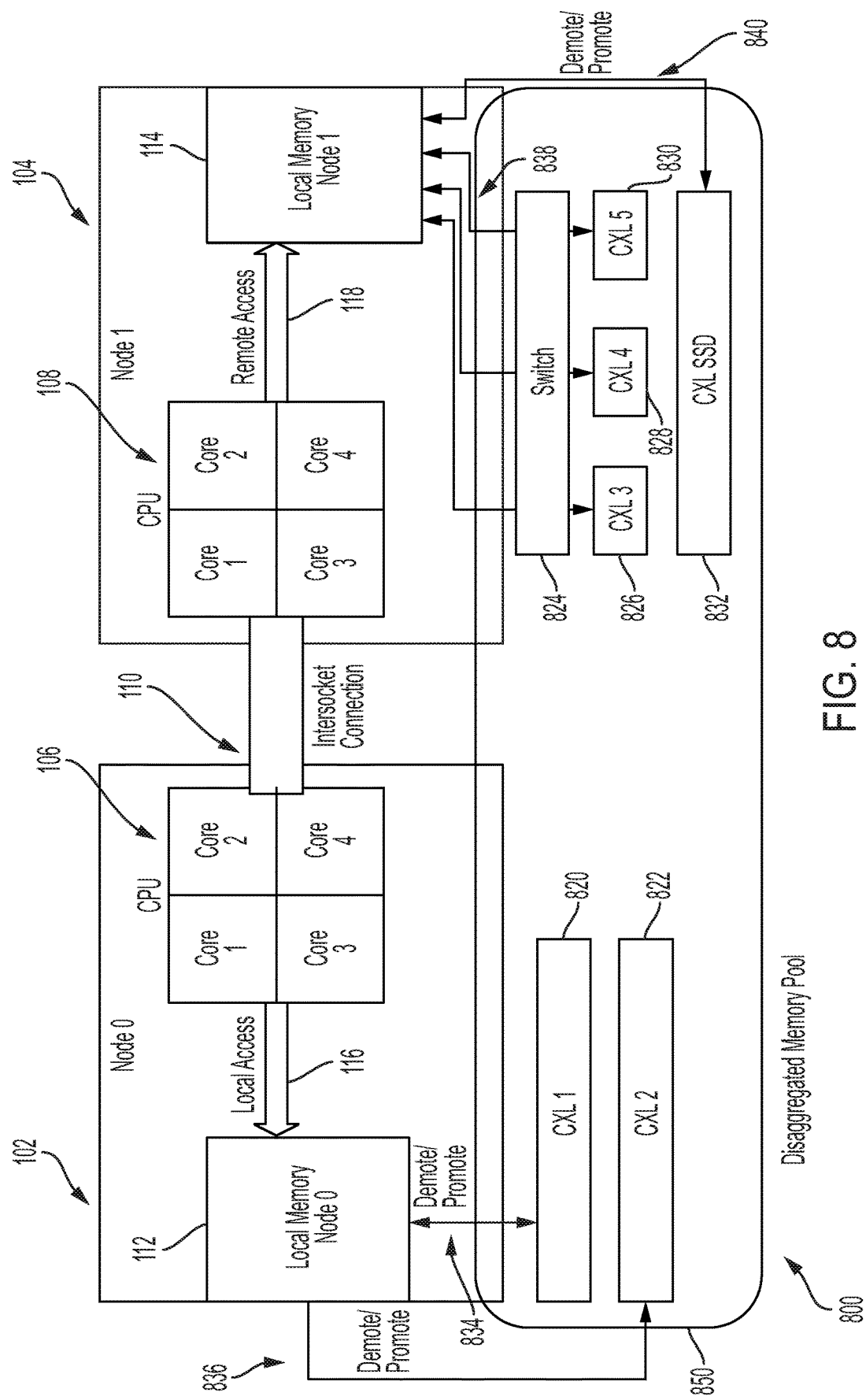
FIG. 8 illustrates an embodiment of a host system architecture using migration between local memory and a disaggregated pool of memory in accordance with example embodiments of the disclosure.

FIG. 8 illustrates an embodiment of a host system architecture using migration between local memory and a disaggregated pool of memory in accordance with example embodiments of the disclosure. The embodiment illustrated in FIG. 8 may include a host system 800 implementing relative distances. Portions of FIG. 8 may be similar to those described with respect to FIG. 1 and FIG. 2 with regards to the first processing unit 102 and the second processing unit 104. However, FIG. 8 may illustrate using multiple devices (e.g., CXL devices) in a disaggregated memory pool 850. The memory devices in the disaggregated memory pool 850 may be connected to the processing units, and/or may be accessible directly from a processing unit, such as a first memory device 820 and a second memory device 822 which may connect to the first processing unit 102 via the node 0 local memory 112. Additionally, or alternatively, the first processing unit 102 may be connected to one or more additional memory devices of the disaggregated memory pool 850 using remote access via the second processing unit 104, where a memory device such as an SSD memory device 832 may connect to the second processing unit 104 via the node 1 local memory 114. Furthermore, connections may travel via intervening equipment, such as a switch 824 which may intervene with signals traveling between the second processing unit 104 and a third memory device 826, a fourth memory device 828, and a fifth memory device 830.

FIG. 8 also illustrates exemplary demotion and/or promotion pathways for the devices. One or more memory device may connect with a processing unit to promote and demote memory between the devices and local memory, as well as promote and/or demote memory between the individual devices. For example, a first demote/promote pathway 834 may connect between the first memory device 820 and the first processing unit 102 via the node 0 local memory 112, while a second demote/promote pathway 836 may connect between the second memory device 822 and the first processing unit 102 via the node 0 local memory 112. The multiple promotion/demotion pathways may enable promotion from the first memory device 820 to the node 0 local memory 112, demotions from the node 0 local memory 112 to the first memory device 820, and/or for both promotions and demotions to occur between the first memory device 820 and the second memory device 822. For example, the first memory device 820 may be set as a first-tier of memory and the second memory device 822 may be set as a second-tier of memory, such that a page on the second memory device 822 may be promoted to the first-tier on the first memory device 820, or a page on the first memory device 820 may be demoted to the second-tier on the second memory device 822. The promotion and demotion processes for the pages may include processes such as those in FIGS. 3-6.

Additionally, or alternatively, the host system 800 may allow promotion and/or demotion within the disaggregated memory pool 850. For example, a third demote and/or promote pathway 838 may connect via switch 824 to the third memory device 826, the fourth memory device 828, and/or the fifth memory device 830, while a fourth demote and/or promote pathway 840 may connect to the SSD memory device 832. The host system 800 may use these pathways to promote or demote pages from either of the first memory device 820 and the second memory device 822 to any of the third memory device 826, the fourth memory device 828, the fifth memory device 830 and/or the SSD memory device 832. The host system 800 may additionally, or alternatively, calculate the relative distance of the various memory devices to the first processing unit 102 and create a tiering for one or more of the memory devices in the disaggregated memory pool 850 for the first processing unit 102. Based on the resulting tiering, memories may be stored anywhere within the disaggregated memory pool 850, and may not be limited to memory devices local to a processing unit. Additionally, or alternatively, memories may be further migrated between the disaggregated memory pool 850 and the local memories of the processing units.

Figure 9:
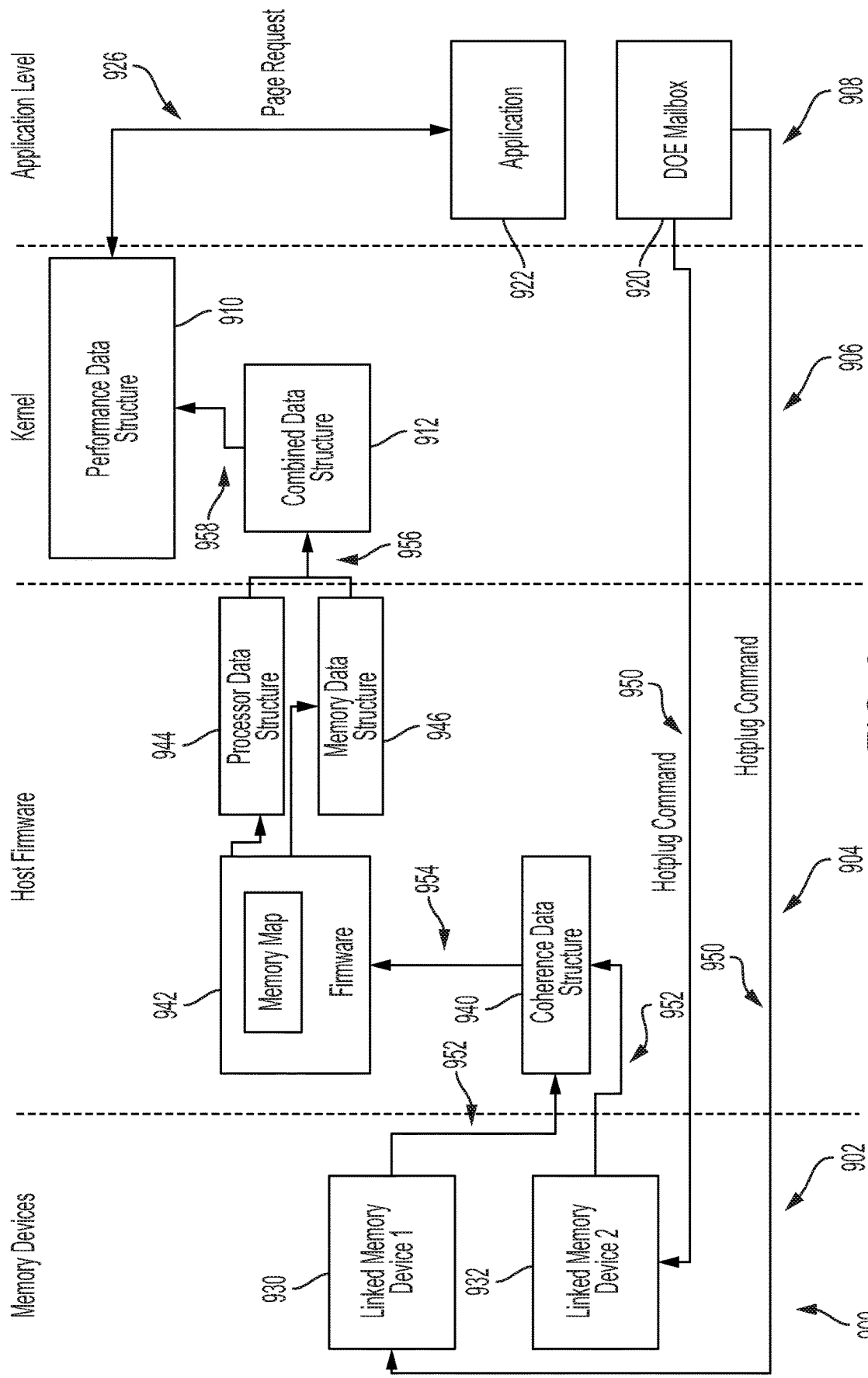
FIG. 9 illustrates an embodiment of a device hot plug scheme in accordance with example embodiments of the disclosure.

FIG. 9 illustrates an embodiment of a device hot plug scheme in accordance with example embodiments of the disclosure. The embodiment illustrated in FIG. 9 may include one or more operations of a host system 900. The host system 900 may be split into a memory device layer 902, a host firmware layer 904, a kernel layer 906, and/or an application layer 908. Within the kernel layer 906 a performance data structure 910 may contain a weighted district metric identifying the relative distance between a processor and one or more of the connected memory devices, for example, as shown by FIG. 7 and/or FIG. 8. The host system 900 may update the performance data structure based on changes to the performance of the connected memory devices as well and/or by adding and/or subtracting devices. In an example of a hot plug-in when adding a new memory device to the system, a Data Object Exchange (DOE) mailbox 920 in the application layer 908 may send a device hot plug command 950 to a corresponding DOE mailbox in a first linked memory device 930 and a second linked memory device 932. The device hot plug command 950 may request various information about the performance of the linked memory devices, such as type of memory, interleaving granularity, capacity, region information, type of interleaving used within the memory device, and/or the like. Furthermore, the response from each memory device may allow for measuring performance of other factors such the delay time and amount of time required for a complete response which may be used in determining factors such as latency and bandwidth.

The responses 952 from the first linked memory device 930 and the second linked memory device 932 may travel to a coherence data structure 940 in the host firmware layer 904. The coherence data structure 940 may store performance characteristics data for coherent components and may take the form of a Coherent Device Attribute Table (CDAT) in a system (e.g., a CXL system). The data in the coherence data structure 940 may perform an update 954 to firmware 942. The firmware 942 may store data such as a memory map, including an e820 memory map, and/or one or more System Physical Address (SPA) ranges. Data in the firmware 942 may feed a processor data structure 944 and/or a memory data structure 946. The processor data structure 944 may store data associating processors of the host system 900 with memory ranges, and/or, in some embodiments, may take the form of a System Resource Affinity Table (SRAT) (e.g., in a CXL system). The memory data structure 946 may describe the memory attributes, such as memory side cache attributes and/or bandwidth and latency details between any processor and connected memory device and may, in some embodiments, take the form of a Heterogeneous Memory Attribute Table (HMAT) (e.g., in a CXL system). The processor data structure 944 and/or the memory data structure 946 may perform an update 956 to a combined data structure 912 in the kernel layer 906. The combined data structure 912 describes system information, features, and methods for controlling those features, and may take the form of an Advanced Configuration and Power Interface (ACPI) table (e.g., in a CXL system). A final update 958 may be performed in the kernel layer 906 to the performance data structure 910 providing the performance data for evaluation and/or tiering, such as in the example embodiment of FIG. 7.

When an application 922 within the application layer 908 performs an action requiring a page request 926, the page request 926 may travel to the performance data structure 910 in the kernel layer 906. Based on the page request 926, a page may be allocated to the application within the tiered memory structure.

Figure 10:
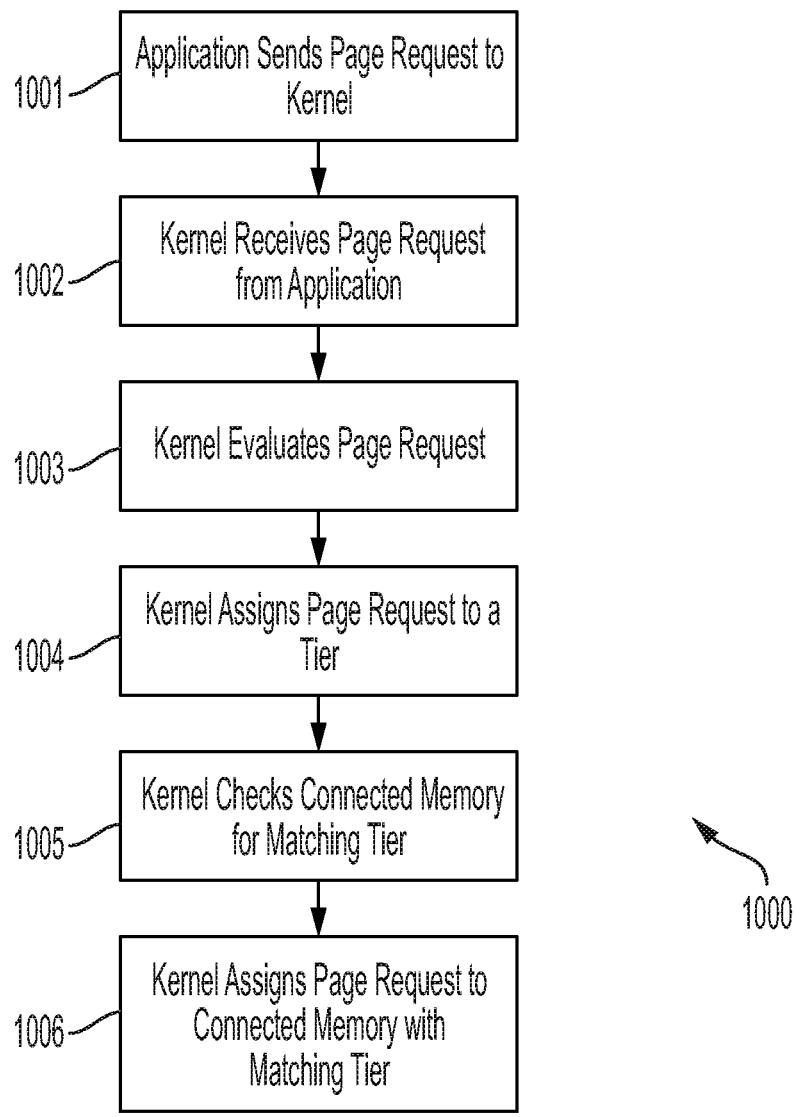
FIG. 10 illustrates an embodiment of a method of servicing memory page requests in accordance with example embodiments of the disclosure.

FIG. 10 illustrates an embodiment of a method of servicing memory page requests in accordance with example embodiments of the disclosure. The embodiment illustrated in FIG. 10 may include a page assignment method 1000 within a host system (e.g., a CXL host system). At operation 1001 an application, such as application 922 in FIG. 9, may send a page request to the kernel. At operation 1002 the kernel may receive the page request from the application. At operation 1003, the kernel may evaluate the page request and, using this evaluation, at operation 1004 the kernel may assign the page request to a tier of memory. At operation 1005, the kernel may use the performance metrics to check for available memory space within a connected memory device of the appropriate tier. At operation 1006, the kernel may assign the page request with an appropriate memory space within a connected memory device of the assigned tier. In some embodiments, the kernel may assign the page request to the memory device within the assigned tier with the shortest relative distance.

Although some example embodiments may be described in the context of specific implementation details such as a processing system that may implement a NUMA architecture, memory devices, and/or pools that may be connected to a processing system using an interconnect interface and/or protocol CXL, and/or the like, the principles are not limited to these example details and may be implemented using any other type of system architecture, interfaces, protocols, and/or the like. For example, in some embodiments, one or more memory devices may be connected using any type of interface and/or protocol including Peripheral Component Interconnect Express (PCIe), Nonvolatile Memory Express (NVMe), NVMe-over-fabric (NVMe oF), Advanced extensible Interface (AXI), Ultra Path Interconnect (UPI), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof. In some embodiments, an interconnect interface may be implemented with one or more memory semantic and/or memory coherent interfaces and/or protocols including one or more CXL protocols such as CXL.mem, CXL.io, and/or CXL.cache, Gen-Z, Coherent Accelerator Processor Interface (CAPI), Cache Coherent Interconnect for Accelerators (CCIX), and/or the like, or any combination thereof. Any of the memory devices may be implemented with one or more of any type of memory device interface including DDR, DDR2, DDR3, DDR4, DDR5, LPDDRX, Open Memory Interface (OMI), NVLink, High Bandwidth Memory (HBM), HBM2, HBM3, and/or the like.

In some embodiments, any of the memory devices, memory pools, hosts, and/or the like, or components thereof, may be implemented in any physical and/or electrical configuration and/or form factor such as a free-standing apparatus, an add-in card such as a PCIe adapter or expansion card, a plug-in device, for example, that may plug into a connector and/or slot of a server chassis (e.g., a connector on a backplane and/or a midplane of a server or other apparatus), and/or the like. In some embodiments, any of the memory devices, memory pools, hosts, and/or the like, or components thereof, may be implemented in a form factor for a storage device such as 3.5 inch, 2.5 inch, 1.8 inch, M.2, Enterprise and Data Center SSD Form Factor (EDSFF), NF1, and/or the like, using any connector configuration for the interconnect interface 202 such as a SATA connector, SCSI connector, SAS connector, M.2 connector, U.2 connector, U.3 connector, and/or the like. Any of the devices disclosed herein may be implemented entirely or partially with, and/or used in connection with, a server chassis, server rack, dataroom, datacenter, edge datacenter, mobile edge datacenter, and/or any combinations thereof. In some embodiments, any of the memory devices, memory pools, hosts, and/or the like, or components thereof, may be implemented as a CXL Type-1 device, a CXL Type-2 device, a CXL Type-3 device, and/or the like.

In some embodiments, any of the functionality described herein, including, for example, any of the logic to implement tiering, device selection, and/or the like, may be implemented with hardware, software, or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In this disclosure, numerous specific details are set forth in order to provide a thorough understanding of the disclosure, but the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" may include any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

The term "module" may refer to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth. Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

Since the inventive principles of this patent disclosure may be modified in arrangement and detail without departing from the inventive concepts, such changes and modifications are considered to fall within the scope of the following claims.

The invention claimed is:

1. A method comprising:
receiving a request for a memory page in a memory tier of a device comprising a first memory device and a second memory device, wherein the first memory device has a first parameter and the second memory device has a second parameter;
selecting, based on the first parameter and the second parameter, the first memory device; and
allocating, based on the request, based on the selecting, the memory page from the first memory device.

2. The method of claim 1, wherein the selecting comprises:
determining a first result based on the first parameter;
determining a second result based on the second parameter; and
comparing the first result and the second result.

3. The method of claim 2, wherein the determining the first result comprises combining the first parameter with a first weight.

4. The method of claim 3, wherein:
the first weight comprises a first scale factor; and
the combining the first parameter with the first weight comprises multiplying the first parameter and the first scale factor.

5. The method of claim 4, wherein:
the determining the second result comprises combining the second parameter with a second weight;
the second weight comprises a second scale factor; and
the combining the second parameter with the second weight comprises multiplying the second parameter by the second scale factor.

6. The method of claim 3, further comprising calculating, at least partially, the first weight.

7. The method of claim 3, further comprising receiving, at least partially, from a user, the first weight.

8. The method of claim 1, wherein the first parameter comprises at least one of a latency, a bandwidth, or a utilization percentage.

9. The method of claim 1, further comprising receiving, from the first memory device, at least partially, the first parameter.

10. The method of claim 1, further comprising measuring, at least partially, the first parameter.

11. The method of claim 1, further comprising obtaining, at least partially, the first parameter from a memory data structure.

12. The method of claim 1, wherein:
the first memory device is a logical memory device based on a first physical memory device and a second physical memory device; and
the first parameter is based on interleaving the first physical memory device and the second physical memory device.

13. The method of claim 1, wherein the first parameter is based on an interleaving granularity of the first memory device.

14. A system comprising:
one or more processors, wherein at least one of the one or more processors is configured to:
receive a request for a memory page in a memory tier of a device comprising a first memory device and a second memory device, wherein the first memory device has a first parameter and the second memory device has a second parameter;
perform a selection, based on the first parameter and the second parameter, of the first memory device; and
allocate, based on the request, based on the selection, the memory page from the first memory device.

15. The system of claim 14, wherein at least one of the one or more processors is configured to determine the first parameter.

16. The system of claim 15, wherein the at least one of the one or more processors is configured to receive the first parameter using a hot plug operation.

17. The system of claim 14, further comprising:
a memory pool, wherein the memory pool comprises the first memory device and the second memory device; and
a switch connected between at least one of the one or more processors and the first memory device.

18. A method comprising:
determining, based on a tiering request, a distance between a processor of a device and a tiered memory device of the device; and
allocating, based on the distance, a memory page from the tiered memory device.

19. The method of claim 18, wherein the determining the distance is based on a parameter of the tiered memory device.

20. The method of claim 19, wherein the determining the distance comprises multiplying the parameter and a weight.

* * * * *